(12) United States Patent
Seigneur et al.

(10) Patent No.: US 9,192,997 B2
(45) Date of Patent: Nov. 24, 2015

(54) BAR MOUNTED SHARPENER

(75) Inventors: Christopher Seigneur, West Linn, OR (US); Ian Osborne, Hillsboro, OR (US)

(73) Assignee: Blount, Inc., Portland, OR (US)

( * ) Notice: Subject to any disclaimer, the term of this patent is extended or adjusted under 35 U.S.C. 154(b) by 574 days.

(21) Appl. No.: 12/909,712

(22) Filed: Oct. 21, 2010

(65) Prior Publication Data

US 2011/0030223 A1    Feb. 10, 2011

Related U.S. Application Data

(63) Continuation-in-part of application No. 12/492,017, filed on Jun. 25, 2009, now Pat. No. 8,746,118.

(60) Provisional application No. 61/253,788, filed on Oct. 21, 2009, provisional application No. 61/111,145, filed on Nov. 4, 2008, provisional application No. 61/078,951, filed on Jul. 8, 2008.

(51) Int. Cl.
*B26D 1/00*    (2006.01)
*B23D 63/16*    (2006.01)

(52) U.S. Cl.
CPC .................................. *B23D 63/168* (2013.01)

(58) Field of Classification Search
CPC .............................. B23D 63/168; B23D 63/14
USPC ................ 30/381, 382, 386, 151, 138; 83/13; 76/80.5, 88, 82; 451/28, 419
See application file for complete search history.

(56) References Cited

U.S. PATENT DOCUMENTS

| 2,508,784 | A | 5/1950 | Cox |
|---|---|---|---|
| 2,522,799 | A | 9/1950 | Pitcher |
| 2,558,678 | A | 6/1951 | Garrett |
| 2,642,102 | A | 6/1953 | Dunnington |
| 2,651,336 | A | 9/1953 | Warren |
| 2,729,987 | A | 1/1956 | Bluemink |
| 2,730,143 | A | 1/1956 | Ryde |
| 2,744,548 | A | 5/1956 | Stephenson |
| 2,744,584 | A | 5/1956 | Hellon |
| 2,821,097 | A | 1/1958 | Carlton |
| 2,832,180 | A | 4/1958 | Carlton |

(Continued)

FOREIGN PATENT DOCUMENTS

| DE | 3734148 A1 | 4/1989 |
|---|---|---|
| RU | 2021885 C1 | 10/1994 |

(Continued)

OTHER PUBLICATIONS

Omark Industries of Canada Ltd.; "Omark Industries of Canada Ltd. Presents Oregon Power-Sharp System to Pioneer Saws Ltd.;" Canada; 1960s (estimated).

(Continued)

*Primary Examiner* — Omar Flores Sanchez
(74) *Attorney, Agent, or Firm* — Schwabe Williamson & Wyatt (57) ABSTRACT

Embodiments include a sharpening fixture adapted to mount to the nose of a chainsaw guide bar. When mounted, the operator may direct a force towards the guide bar thereby causing a linear directed actuator to move a sharpening element into engagement with cutters of a saw chain to sharpen a cutting edge of the cutters. In various embodiments, the actuator is biased such that when the force is no longer applied, the actuator pulls the sharpening element out of engagement with the cutters.

5 Claims, 7 Drawing Sheets

(56) References Cited

U.S. PATENT DOCUMENTS

| | | | |
|---|---|---|---|
| 2,832,380 A | 4/1958 | Crowe | |
| 2,869,534 A | 1/1959 | Stihl | |
| 2,884,031 A | 4/1959 | Standal | |
| 2,912,968 A | 11/1959 | Stihl | |
| 2,916,771 A | 12/1959 | Lang | |
| 2,924,110 A | 2/1960 | Gudmendsen | |
| 2,976,900 A | 3/1961 | Mills | |
| 2,986,797 A | 6/1961 | Aisenberg | |
| 2,989,096 A | 6/1961 | Irgens | |
| 3,040,602 A | 6/1962 | Carlton | |
| 3,066,711 A | 12/1962 | Winnlert | |
| 3,138,973 A | 6/1964 | Muir | |
| 3,147,644 A | 9/1964 | Oehrli | |
| 3,170,497 A | 2/1965 | Ehlen | |
| 3,180,001 A | 4/1965 | Nash | |
| 3,180,378 A | 4/1965 | Carlton | |
| 3,183,948 A | 5/1965 | Carlton | |
| 3,186,028 A | 6/1965 | Dobbins | |
| 3,189,064 A | 6/1965 | Frederickson | |
| 3,191,225 A | 6/1965 | Polka | |
| 3,224,040 A | 12/1965 | Bridges | |
| 3,260,287 A | 7/1966 | Oehrli | |
| 3,263,717 A | 8/1966 | Silvon | |
| 3,269,431 A | 8/1966 | Ehlen | |
| 3,301,098 A | 1/1967 | Oehrli | |
| 3,308,859 A | 3/1967 | Ehlen | |
| 3,346,025 A | 10/1967 | Anderson | |
| 3,361,012 A | 1/1968 | Fullerton | |
| 3,380,496 A | 4/1968 | Hill | |
| 3,435,860 A | 4/1969 | Silvon | |
| 3,457,969 A * | 7/1969 | Carter | 30/123 |
| 3,465,617 A | 9/1969 | Silvon | |
| 3,465,795 A | 9/1969 | Tupper | |
| 3,469,610 A | 9/1969 | Silvon | |
| 3,473,582 A | 10/1969 | Lanz | |
| 3,487,591 A | 1/1970 | Silvon | |
| 3,502,122 A | 3/1970 | Silvon | |
| 3,516,459 A | 6/1970 | Silvon | |
| 3,526,156 A | 9/1970 | Condon | |
| 3,527,122 A | 9/1970 | Oehrli | |
| 3,529,495 A | 9/1970 | Graversen | |
| 3,534,638 A | 10/1970 | Van Ourkerk | |
| 3,543,612 A | 12/1970 | Silvon | |
| 3,545,508 A | 12/1970 | Tupper | |
| 3,569,689 A | 3/1971 | Nestrock | |
| 3,581,785 A | 6/1971 | Neumeier | |
| 3,596,689 A * | 8/1971 | Oehrli | 30/138 |
| 3,601,167 A | 8/1971 | Dolata | |
| 3,603,179 A | 9/1971 | Stihl | |
| 3,613,749 A | 10/1971 | Geurian | |
| 3,714,974 A | 2/1973 | Bullard | |
| 3,744,349 A | 7/1973 | Juncker | |
| 3,889,556 A * | 6/1975 | Bair et al. | 76/80.5 |
| D237,248 S | 10/1975 | Santore | |
| 3,921,490 A * | 11/1975 | Dolata et al. | 83/833 |
| 3,942,255 A | 3/1976 | Bakoledis | |
| 4,023,453 A | 5/1977 | Dolata | |
| D246,756 S | 12/1977 | Smyth | |
| 4,062,253 A | 12/1977 | Dilworth | |
| D250,086 S | 10/1978 | Granberg | |
| D256,426 S | 8/1980 | Aksamit | |
| D257,527 S | 11/1980 | Aksamit | |
| 4,348,926 A | 9/1982 | Dolata | |
| 4,348,927 A | 9/1982 | Olmr | |
| 4,353,277 A | 10/1982 | Silvon | |
| 4,355,551 A | 10/1982 | Kolleas | |
| 4,382,334 A | 5/1983 | Reynolds | |
| 4,385,532 A | 5/1983 | Dolata | |
| 4,393,739 A | 7/1983 | Olmr | |
| 4,404,871 A | 9/1983 | Fritz | |
| 4,404,872 A | 9/1983 | Fritz | |
| 4,409,874 A | 10/1983 | Nitschmann | |
| D271,276 S | 11/1983 | Reynolds | |
| 4,438,667 A | 3/1984 | Hannah | |
| 4,457,069 A | 7/1984 | Close | |
| 4,463,499 A | 8/1984 | Fritz | |
| 4,503,735 A | 3/1985 | Jackson | |
| 4,506,565 A | 3/1985 | Potter | |
| 4,530,258 A | 7/1985 | Gibson | |
| 4,530,679 A | 7/1985 | Reynolds | |
| 4,535,667 A | 8/1985 | Gibson | |
| 4,567,792 A | 2/1986 | Baldwin | |
| 4,581,968 A | 4/1986 | Gibson | |
| 4,597,178 A | 7/1986 | Dolata | |
| D285,899 S | 9/1986 | Bohman | |
| 4,625,610 A | 12/1986 | Petrovich | |
| 4,643,065 A | 2/1987 | MacGavin | |
| 4,677,881 A | 7/1987 | Jorde | |
| 4,785,700 A | 11/1988 | Petrovich | |
| 4,813,323 A | 3/1989 | Harfst | |
| 4,843,718 A | 7/1989 | Nagashima et al. | |
| 4,864,897 A | 9/1989 | Newman | |
| 4,896,575 A | 1/1990 | Sundstrom | |
| 4,911,050 A | 3/1990 | Nitschmann | |
| 4,966,055 A | 10/1990 | Staggs | |
| 5,056,395 A | 10/1991 | Wovak | |
| 5,098,348 A | 3/1992 | O'Neel | |
| 5,184,598 A | 2/1993 | Bell | |
| 5,215,072 A | 6/1993 | Scott | |
| 5,666,871 A | 9/1997 | Burrows | |
| 5,671,725 A | 9/1997 | Dishaw | |
| 5,740,715 A | 4/1998 | Burrows | |
| 5,974,933 A | 11/1999 | Burrows | |
| 6,006,629 A | 12/1999 | Lofgren | |
| 6,058,806 A | 5/2000 | Ford | |
| 6,128,997 A | 10/2000 | Nitschmann | |
| 6,161,453 A | 12/2000 | Hensley | |
| RE37,288 E | 7/2001 | Burrows | |
| 6,283,112 B1 | 9/2001 | Berglund | |
| 6,334,809 B1 | 1/2002 | Spang | |
| 6,389,700 B2 * | 5/2002 | Paquin | 30/382 |
| 6,435,070 B1 | 8/2002 | Weber | |
| 6,446,534 B1 | 9/2002 | Harfst | |
| 6,748,840 B2 | 6/2004 | Harfst | |
| 6,871,573 B2 | 3/2005 | Mang | |
| 7,381,120 B2 | 6/2008 | Henry | |
| 7,434,575 B2 | 10/2008 | Lehmann | |
| 7,900,536 B2 | 3/2011 | Hensley | |
| D663,602 S * | 7/2012 | Seigneur | D8/91 |
| 2003/0213344 A1 | 11/2003 | Andress | |
| 2004/0134478 A1 | 7/2004 | Bailey | |
| 2004/0182216 A1 | 9/2004 | Morrison | |
| 2005/0115379 A1 | 6/2005 | Schulz | |
| 2005/0268765 A1 | 12/2005 | Chien | |
| 2007/0167122 A1 | 7/2007 | Henry | |
| 2007/0169598 A1 | 7/2007 | Szymanski | |
| 2007/0238402 A1 | 10/2007 | Hensley | |
| 2009/0199680 A1 | 8/2009 | Jorde | |
| 2010/0005666 A1 | 1/2010 | Seigneur | |
| 2011/0030223 A1 | 2/2011 | Seigneur | |

FOREIGN PATENT DOCUMENTS

| | | |
|---|---|---|
| SU | 294302 A3 | 4/1994 |
| WO | 9600627 | 1/1996 |
| WO | 9900211 | 1/1999 |
| WO | 9938638 | 8/1999 |
| WO | WO0123128 | 4/2001 |

OTHER PUBLICATIONS

Craftsman; "Owner's Manual, Craftsman 3.7 Chain Saw or 3.7PS Chain Saw;" Sears, Roebuck and Co., p. 779J-14.3.79; Chicago, Illinois, USA; 1979 (estimated).

Power Sharp Starter Kit; downloaded Mar. 24, 2011 at http://www.powersharp.com/powersharp_StarterKit-single.asp.

Powersharp; Sharpens Chain on the Saw, on the Job, in Seconds; downloaded Mar. 24, 2011 at http://www.powersharp.com/.

* cited by examiner

BAR MOUNTED SHARPENER

CROSS REFERENCE TO RELATED APPLICATIONS

The present application claims priority to Provisional Patent Application No. 61/253,788, filed on Oct. 21, 2009. This application is also a continuation-in-part of application Ser. No. 12/492,017, filed on Jun. 25, 2009, which, in turn, claims priority to Provisional Application Nos. 61/078,951 filed on Jul. 8, 2008, and 61/111,145 filed on Nov. 4, 2008. These disclosures are hereby incorporated by reference in their entirety, except those sections, if any, which are inconsistent with this disclosure.

TECHNICAL FIELD

Embodiments herein relate to the field of chain saws, and, more specifically, to bar mounted sharpeners for various types of chains.

BACKGROUND

Chain saws are typically used to fell trees, trim branches, and cut a variety of materials, among other tasks. They generally include an engine enclosed within a housing, a guide bar extending from the housing, and an endless saw chain loop that may include various links such as, but not limited to, cutter links, center links, side links, tie straps, and drive links. Through use, the cutting surfaces of various links may become dulled and worn. As the cutting surfaces experience wear, an increased amount of force is required to produce a desired cut, which is inefficient and consumes energy. Therefore, cutter links of saw chains are periodically sharpened to maintain efficiency in a cutting operation.

One method of sharpening cutter links includes positioning a sharpening element (e.g. an abrasive stone) within the housing of the chain saw. The sharpening element may be positioned so as to contact the various saw chain links as they traverse a drive sprocket, typically at high speeds. These systems, however, have drawbacks. For example, one or more grooves may be worn into the surface of the sharpening element from the repeated contact of the various saw chain links. Additionally, because the sharpening element is continually present during cutting operations, damage may occur through debris impacting the sharpening element or chain throw, where the saw chain unintentionally impacts the sharpening element. Any defect in the sharpening element may cause the cutting edge to become deformed during the sharpening process or otherwise negatively impact the ability to maintain a proper cutting edge. This may ultimately impact the ability of the chain saw to cut various materials.

Some nose mounted sharpening devices have been used over the years. One example is shown in U.S. Pat. No. 4,597,178. This device includes a long sleeve that is positioned over the nose and extends a good distance along the guide bar. A rotary actuator is positioned at the end of the sleeve to allow an operator to turn the dial to incrementally advance the sharpening stone towards the cutters of the chain. These devices are cumbersome and dangerous, as they require unnecessary operator actuation, and they can tend to over sharpen and cause premature wear and fatigue on the cutters. Another device, such as those shown in U.S. Pat. No. 4,530,258, includes nose mounted sharpeners that have a pivoting sharpening element. These are deficient for many reasons as well. For example, they do not result in an even engagement of the cutters as they traverse the guide bar nose and they do not provide for adequate lateral support of the cutting stone.

DESCRIPTION OF THE DRAWINGS

Embodiments will be readily understood by the following detailed description in conjunction with the accompanying drawings. Embodiments are illustrated by way of example and not by way of limitation in the Figs. of the accompanying drawings.

DESCRIPTION

In the following detailed description, reference is made to the accompanying drawings which form a part hereof, and in which are shown by way of illustration embodiments that may be practiced. It is to be understood that other embodiments may be utilized and structural or logical changes may be made without departing from the scope. Therefore, the following detailed description is not to be taken in a limiting sense, and the scope of embodiments is defined by the appended claims and their equivalents.

Various operations may be described as multiple discrete operations in turn, in a manner that may be helpful in understanding embodiments; however, the order of description should not be construed to imply that these operations are order dependent.

The terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still cooperate or interact with each other.

The description may use the terms "embodiment" or "embodiments," which may each refer to one or more of the same or different embodiments. Furthermore, the terms "comprising," "including," "having," and the like, as used with respect to embodiments, are synonymous.

Figure 1:
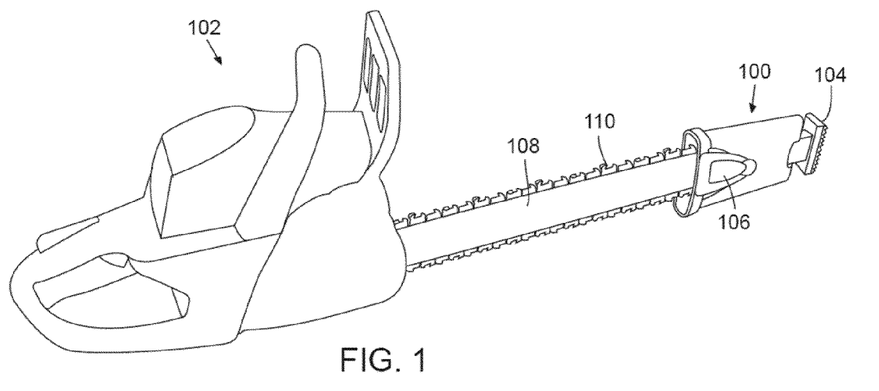
FIG. 1 illustrates a perspective view of a saw chain sharpening fixture coupled to a chain saw in accordance with various embodiments of the disclosure.

Referring to FIG. 1, a saw chain sharpening fixture 100 coupled to a chain saw 102 is illustrated, in accordance with various embodiments. The saw chain sharpening fixture 100 comprises, among other things, an attachment member 106, configured to facilitate attachment of the saw chain sharpening fixture 100 to a guide bar 108, and an actuator 104, configured to bring a sharpening element of the saw chain sharpening fixture 100 into contact with one or more links 110 of the saw chain as they traverse the guide bar 108. In this manner, the saw chain sharpening fixture 100 may be attached to and removed from a guide bar 108, and may sharpen or reform one or more links 110 of the saw chain, for example, one or more cutting links. In exemplary embodiments, the saw chain sharpening fixture 100 may be coupled to a nose portion (shown covered) of the guide bar 108.

Figure 2A:
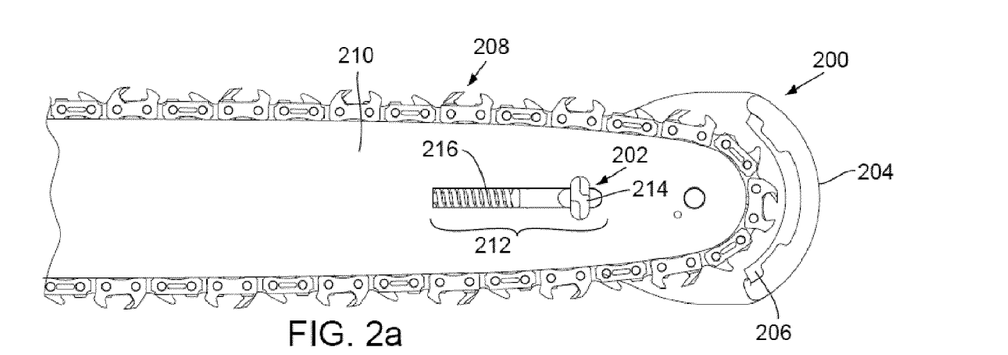
FIGS. 2A-2B illustrate an elevational view of a saw chain sharpening fixture in accordance with various embodiments of the present disclosure.
Figure 2B:
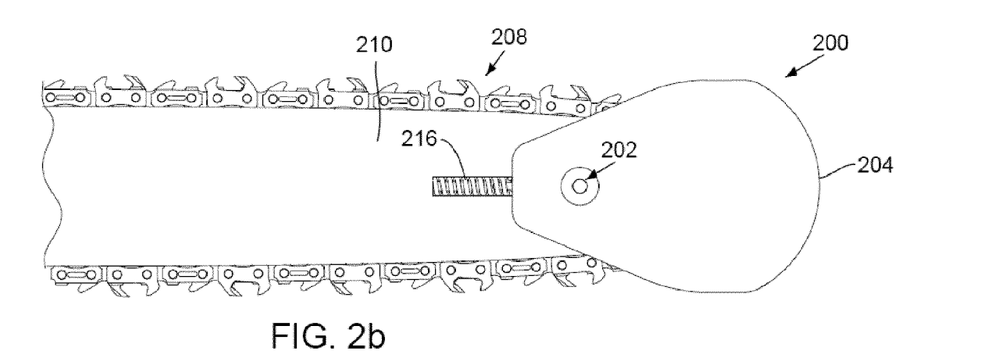

Referring now to FIGS. 2a-b, an embodiment of a saw chain sharpening fixture is illustrated. The saw chain sharpening fixture 200 may comprise an attachment member 202, an actuator 204, and a sharpening element 206. In various embodiments the saw chain sharpening fixture 200 may also function as a tip guard to prevent the saw chain 208 from cutting as it traverses the nose of the guide bar 210. Preventing cutting around the nose of the guide bar 210 may lessen the chain saw's tendency to kick-back and cause injury.

In the illustrated embodiment, the attachment member 202 is a pin configured to mesh with slot 212 or opening of guide bar 210. The pin may include a head 214 configured to rotate relative to the pin in order to secure the saw chain sharpening fixture 200 to the guide bar 210. As illustrated, the saw chain sharpening fixture 200 may be coupled to the guide bar 210 and the head 214 of the attachment member 202 may be rotated relative to the pin in order to selectively secure the saw chain sharpening fixture 200 to the guide bar 210. The attachment member 202 may mesh with a preconfigured recess or slot 212 in the guide bar 210 as illustrated.

The actuator 204 may be coupled to the attachment member 202 and configured to bring a sharpening element 206 into contact with one or more links of a saw chain 208. In the embodiment illustrated in FIGS. 2a-b, the actuator 204 includes a spring 216 that is configured to prevent unwanted contact of the saw chain 208 with the sharpening element 206. The spring 216 may be biased with a spring constant that is substantially equivalent to a weight of the chain saw. To selectively sharpen the saw chain, the actuator 204 may be pressed against an object to generate a force that overcomes the spring bias. The actuator 204 may be the outer surface of the saw chain sharpening fixture 200 and may be adapted for contact with various objects such that when pressed against the objects, the force necessary to overcome the spring bias may be achieved. This may bring the sharpening element 206 into the cutting radius of the saw chain 208 and sharpen various links. While the above embodiment is discussed in terms of moving the sharpening element 206 into the cutting radius of the saw chain 208, those of ordinary skill will understand the corollary of bringing the cutting radius of the saw chain 208 into contact with the sharpening element equally applies.

Figure 3:
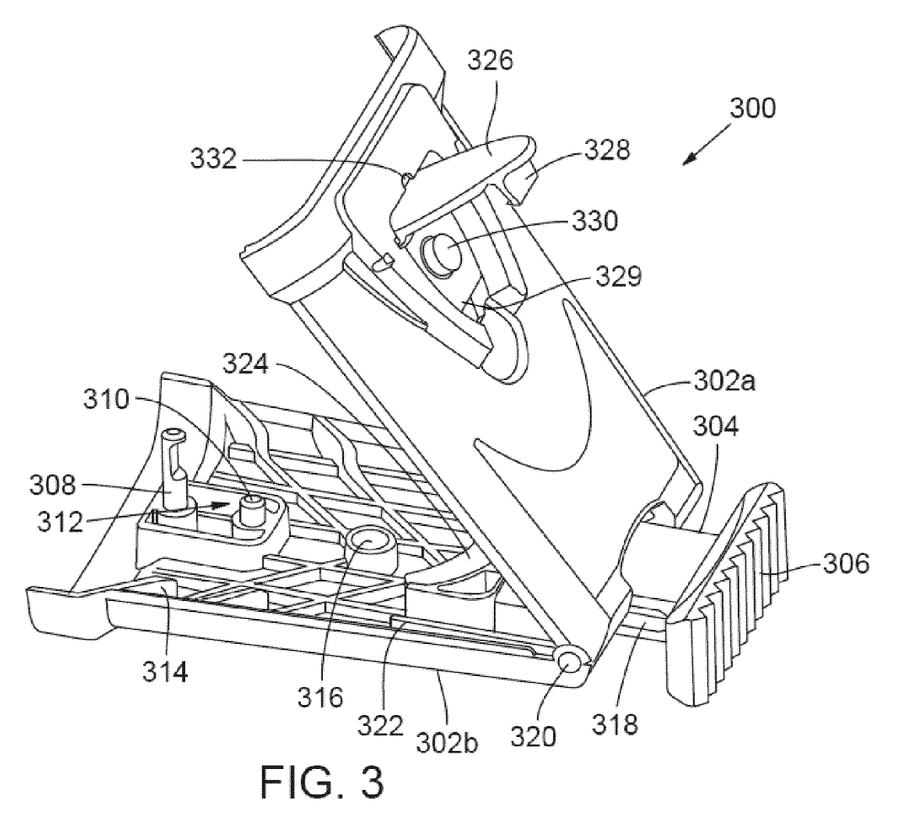
FIG. 3 illustrates a perspective view of a saw chain sharpening fixture in accordance with various embodiments of the present disclosure.

Referring now to FIG. 3, another embodiment of a saw chain sharpening fixture 300 is illustrated. The saw chain sharpening fixture 300 may include a housing 302a, 302b, an actuator 304 having an actuator surface 306, a latch member 308, an alignment member 310, latching recess 312, one or more spark arresters 314, a nose side rivet aligner 316, an actuator guide 318, a hinge pin 320, a sharpening element guide 322, a sharpening element 324, a latch 326 having a catch 328 to couple with edge 329, a latch stop 330, and a latch member recess 332.

In various embodiments, the housing 302a and 302b may be configured to attach to a guide bar of a chain saw, as will be described in more detail with reference to FIGS. 4a-b. The housing 302a and 302b may be a clam-shell type housing configured with a hinge 320 disposed along a first side of the saw chain sharpening fixture 300, for example a width of the saw chain sharpening fixture 300. Alternatively, the hinge 320 may be positioned along a second side of the saw chain sharpening fixture 300, for example a length of the saw chain sharpening fixture 300. In other embodiments, the housing may be in the form of a sleeve configured to slide over the nose of the guide bar, or alternatively, may be two decoupled members configured to engage one another and clamp together. The disclosure is not to be limited to any particular housing. The housing may be configured to at least partially contain the attachment member, the actuator, and the guide bar.

Within the housing 302a and 302b may be one or more alignment aides configured to, among other things, help facilitate attachment of the saw chain sharpening fixture 300 to the guide bar. In various embodiments, various alignment aides may include latch member 308, which may be a pin or other engaging protrusion, alignment member 310, and nose rivet aligner 316. These alignment aides may facilitate alignment of a guide bar with the saw chain sharpening fixture 300.

In various embodiments, latch member 308 and alignment member 310 may be configured to engage a guide bar having complimentary holes or slots. The complimentary holes of the guide bar may be positioned a distance from the nose of the guide bar in order to correctly place the guide bar within the saw chain sharpening fixture 300. In various embodiments, the complimentary holes may be correspondingly placed on guide bars of different lengths. In this manner, the saw chain sharpening fixture 300 may be used with multiple guide bars.

In addition to facilitating alignment of the guide bar, the alignments aides may also encourage stability throughout a sharpening process. Nose rivet aligner 316, for example, may facilitate alignment of the guide bar, and may further provide stability. Nose rivet aligner 316 may be positioned a distance from the latch member 308, alignment member 310, or a circumference of the guide bar such that it engages a nose rivet of the guide bar. Through engagement of the rivet, the nose of the guide bar, and consequently, various saw chain elements, may be held in a desired position for sharpening. This may, in various embodiments, help to counteract any forces imposed on the guide bar, for example by grooves or other defects worn into the sharpening element.

Figure 4A:
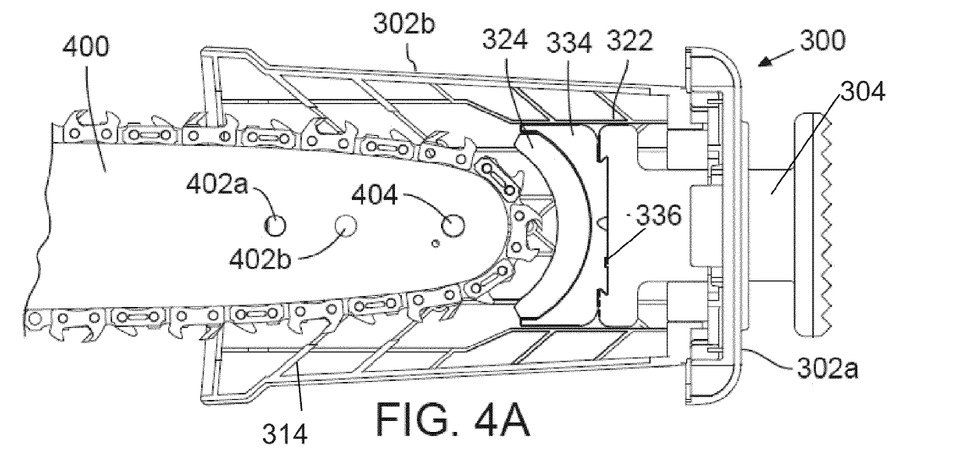
FIGS. 4A-4B illustrate internal views of a saw chain sharpening fixture in accordance with various embodiments of the disclosure.
Figure 4B:
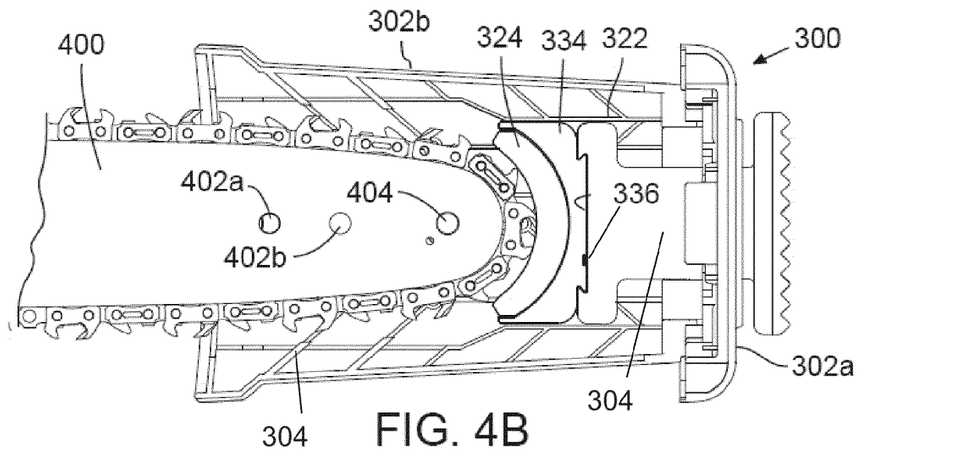

Referring to FIGS. 4a-b, a saw chain sharpening fixture 300 coupled to a guide bar is illustrated in accordance with various embodiments. As illustrated, a guide bar 400 with complimentary holes 402a, 402b may be placed on one side of the saw chain sharpening fixture 300, for example housing 302b. The complimentary holes 402a, 402b may mesh with the alignment aides. For example, a latch member 308 may mesh with the complimentary hole 402a and the alignment member 310 may mesh with complimentary hole 402b. Additionally, rivet 404 may mesh with rivet aligner 316. With alignment aides positioning the guide bar properly, the housing 302a maybe brought into contact with the guide bar and housing 302b. A latching mechanism may be utilized to secure housing 302a to housing 302b with the guide bar properly positioned between.

Referring back to FIG. 3, an attachment member may include a latch mechanism to help facilitate latching of housing 302a, 302b in embodiments where the sharpening fixture 300 consists of two or more housing members. In various embodiments, the latch mechanism may include a latch 326, a latch member 308, a catch 328, and a catch edge 329. For example, a latch 326 may be configured to engage a latch member 308 to secure the housing 302a, 302b in a closed position. With a guide bar correctly positioned on one side of the housing 302b, the corresponding side of the housing 302a may be clamped around the guide bar. The latch 326 may engage the latch member 308 through a latch member recess 332. In various embodiments, the shape of the latch member 308 may be such that a distal end of the latch 326 may engage latch member 308 through latch member recess 332. This is illustrated other figures. As the latch 326 interacts with the latch member 308, the latch 326 may apply a force that urges the latch member 308 out of position. The latch member recess 332 may counteract this force, acting as a backstop, and maintain the latch pin 308 in engagement with the latch 326.

In various embodiments, when the latch 326 is moved into a locked position, a catch 328 may engage an edge 329 of the housing 302a, and the latch 326 may be supported by a latch stop 330. The catch 328 may resist a tendency of a saw chain sharpening fixture 300 to open during operation. In various embodiments, the latch 326 may be loaded with a spring or other biasing element, such that when catch 328 is not securely latched with edge 329, the latch 326 is moved towards an outwardly unlatched position, e.g. generally perpendicular to the surface 302a, as illustrated in FIG. 3. This may visually alert a user that the sharpening element has not be securely latched. In various embodiments, when the latch 326 is properly engaged, latch stop 330 may also help provide support.

In various other embodiments, a tension clamp may engage the latch member 308 to ensure relatively solid connection such that movement of the housing 302a, 302b relative to the guide bar does not occur during a sharpening operation. Various other devices may be used to securely couple the sharpening fixture 300 to a guide bar for example; a wing nut or other threaded device may be used.

In various embodiments, a guide bar may become dirty and or caked with debris. This may hinder a latching process or prevent the housing 302a from properly meshing with housing 302b. In various embodiments, alignment aides such as the latch member 308 and the alignment member 310 may be coupled to a latching recess 312. The latching recess 312 may provide a volume for debris when housing 302a is brought into contact with housing 302b. In various embodiments, this may enable proper meshing of the housing with used, dirty, or debris clad guide bars. Further, the outer perimeter of the latching recess 312 may provide additional clamping surface to aid in the position of the bar in the housing and to resist movement during a sharpening operation.

In various embodiments, the saw chain sharpening fixture 300 may also include an actuator 304. The actuator 304 may be coupled to the housing 302a and 302b, and include a biased lever (e.g. spring loaded) that may selectively bring a sharpening element 324 of the saw chain sharpening fixture into contact with one or more cutting links by moving the sharpening element 324 relative to the housing 302a, 302b. Upon actuation of the actuator 304, for example by actuator surface 306 against a surface via a force directed at the chain saw, sharpening element 324 may be moved into a cutting radius of the saw chain. In various embodiments, the actuator 304 includes a stem portion and a foot portion. The foot portion may have a footprint configured to engage an environmental object to generate an actuation force. The stem may receive the force from the foot portion and transfer the actuation force to the sharpening element.

In various embodiments, the actuator 304 may be configured to resist a motion that would bring the sharpening element 324 into contact with saw chains. As illustrated in FIG. 4a, a spring may force the sharpening element 324 against a distal end of the housing 302a, 302b. This may prevent unwanted contact of the sharpening element 324 with saw chains. The spring may be configured with a spring constant equivalent or substantially equivalent to a weight of a chain saw. Consequently, only a slight force may be needed to bring the sharpening element 324 into contact with the saw chain links.

In another embodiment, the actuator may be embodied within the housing 302a, 302b. For example, the actuator may be a slide rail integral with an attachment member. In this embodiment, the actuator may be configured to bring the sharpening element 324 of the saw chain sharpening fixture into contact with the one or more cutting links by moving the guide bar relative to the housing 302a, 302b. Similar to the previously mentioned embodiment, the actuator may be spring biased to prevent unwanted contact. Those of ordinary skill in the art will understand that other manners of actuating the saw chain sharpening fixture may be utilized without deviating from the scope of the disclosure.

In various embodiments, the actuator 304 may include one or more actuator guides 318. The actuator guide 318 may interface with the hinge 320 of the housing 302a, 302b, and facilitate alignment and stability as the actuator 304 moves into and out of the housing 302a, 302b. The actuator guide 318 may additionally be configured to provide a stop for the actuator 304. This may prevent damage to the actuator 304, for example, if the sharpening element is too worn or missing. In addition to the actuator guides 318 that interface with the hinge 320, the actuator may also interface with a center guide positioned on the housing 302b, which is utilized to house the spring bias.

In addition to facilitating alignment and stability of the actuator as it moves into and out of the housing 302a, 302b, the actuator guide and the center guide also direct the forces imposed on the actuator in planar direction. For example, should the housing be depressed against an object at an angle, the actuator guide and the center guide may resist the tendency of the actuator to apply the sharpening stone to the cutting radius of the saw chain at an angle. This may facilitate even wear of the stone and reduce unwanted wear on the saw chain. In one embodiment, the actuator may receive a force directed at an angle to a reference line defined by a centered longitudinal axis of the guide bar. The actuator and the center guide may translate the force directed at the angle into a force directed along or parallel to the reference line. In other words, the actuator and the center guide may cancel a directivity component of an actuation force that is not parallel to the reference line.

In various embodiments, actuator 304 may further include an actuator surface 306. Actuator surface 306 may be configured to engage a hard surface for bringing the sharpening element 324 into the cutting radius of a saw chain. The actuator surface 306 may include multiple ridges, or other friction increasing arrangements. While the actuator surface 306 is depicted as being rectangular in appearance, the actuator surface may be any shape without departing from this disclosure. The actuator 304 may be configured to move into and out of the housing 302a, 302b to bring the sharpening element into the cutting radius of the saw chain.

Referring to FIGS. 4A-4B, the actuator 304 is configured to bring the sharpening element 324 into contact with the saw chain. The sharpening element 324 may be any material suitable for sharpening various cutting links of a saw chain, for example, a sharpening stone. The sharpening element 324 may be configured to interact with a saw chain as it traverses the nose of the guide bar, and therefore, may be crescent shaped. Other shapes are also contemplated.

In various embodiments, the sharpening element 324 may be coupled to a sharpening element holder 334 which is configured to couple with the actuator 304. The actuator 304 may include a sharpening element attachment to facilitate the coupling of the sharpening element holder. In the illustrated embodiment, the sharpening element holder 334 (and thus the sharpening element 324) may be coupled to the actuator via a dove tail joint (as illustrated in FIGS. 4A and 4B). Other manners of coupling the sharpening element 324 and the sharpening element holder 334 may be used. When the housing 302a, 302b is open, sharpening element 324 may be removed and/or replaced. On one embodiment, the sharpening element holder 334 may also include a key 336. The key 336 may ensure that the sharpening element holder 334 is correctly inserted into the saw chain sharpening fixture 300. As the sharpening element 324 becomes worn, groves may be present. The sharpening element 324 and sharpening element holder 334 should be positioned in the same manner to maintain a proper alignment of the grove.

In addition to the key 336, one or more friction tabs (not illustrated) may be placed on the sharpening element holder 334. The friction tabs may be rubber or another material that is capable of providing resistance suitable for maintaining the position of the sharpening element 324 and the sharpening element holder 334. The friction tab may also reduce vibration of the sharpening element 324 and sharpening element holder 334.

In various embodiments, the sharpening element 324 may also be of a larger size such that it could be utilized for two or more other saw chains. In such an embodiment, the sharpening element 324 could be used in one position for a first saw chain, and subsequently removed, rotated, and reinserted for a second saw chain. Other embodiments are contemplated. Further, while the sharpening element and the sharpening element holder have been described as separable pieces, in various embodiments, they may be made of a single material, permanently coupled together, or detachable such that the sharpening element may be replaced, but not the holder.

In order to provide a consistent application of the sharpening element 324 to the saw chain, the housing 302a, and 302b may include one or more sharpening element guides 322. The sharpening element guides 322 may be disposed parallel to one another and on opposite sides of the sharpening element 324. The sharpening element guides 322 may be disposed on each side of the housing 302a, 302b. As the sharpening element is moved into the cutting radius of the saw chain, via actuation of the actuator 304, the one or more sharpening element guides 322 may ensure the sharpening element 324 is applied to the saw chain in a consistent matter regardless of its wear.

In various embodiments, a sharpening fixture 300 may also include one or more spark arresters 314. The spark arresters 314 may be disposed within the housing 302a, 302b, at an angle to the sharpening element. As a saw chain traverses the nose of the guide bar and interacts with the sharpening element 324, debris may be propelled out of the sharpening fixture 300. Debris may include wood chips, fragments from the sharpening element 324, and/or sparks. The spark arresters 314 may be positioned at an angle to the sharpening element 324 so as to reduce exhaust of debris from the housing when the sharpening element 324 contacts one or more links. In various embodiments, the spark arresters 314 may be positioned such that in the event the housing 302a, 302b is not completely closed, for example in a situation where debris on the guide bar has prevented the housing 302a, 302b from completely meshing, the spark arresters 314 are still functional.

Referring now to FIGS. 5-9, perspective views of a saw chain sharpening fixture are illustrated in accordance with various embodiments. As illustrated in the figures, housing 302a and 302b have been closed. A distal end of latch 326 has engaged the latch member 308 through latch member recess 332, thereby forcing housing 302b, which is attached to latch member 308, into contact with housing 302a, which is attached to latch 326. To secure latch 326 in a closed position, catch 328 has engaged edge 329.

Figure 5:
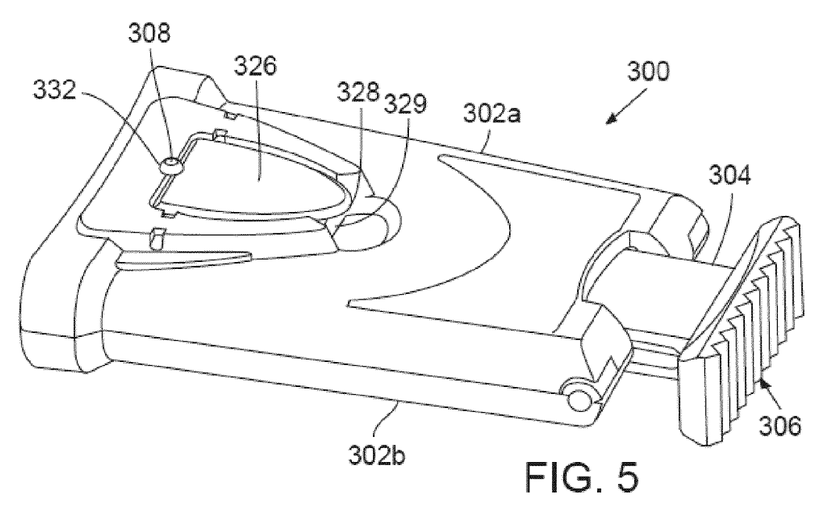
FIG. 5 illustrates a perspective view of a saw chain sharpening saw chain sharpening fixture in accordance with various embodiments.
Figure 6:
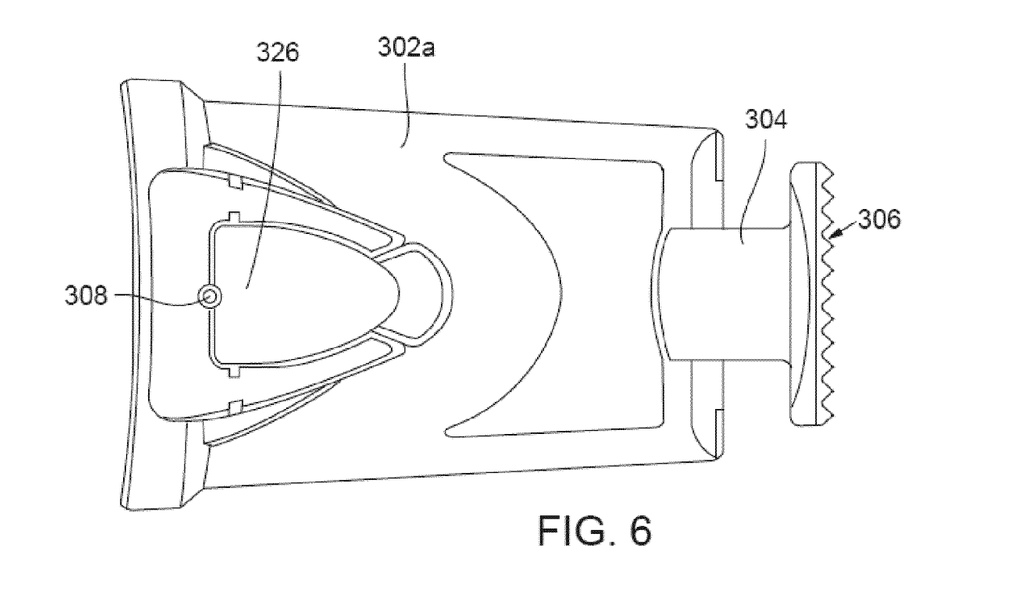
FIG. 6 illustrates a perspective view of a saw chain sharpening fixture in accordance with various embodiments.
Figure 7:
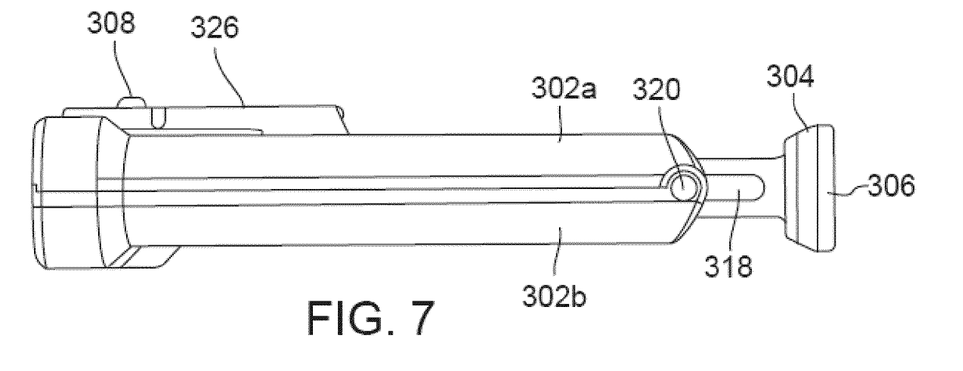
FIG. 7 illustrates an end view of a saw chain sharpening fixture in accordance with various embodiments of the present disclosure.
Figure 8:
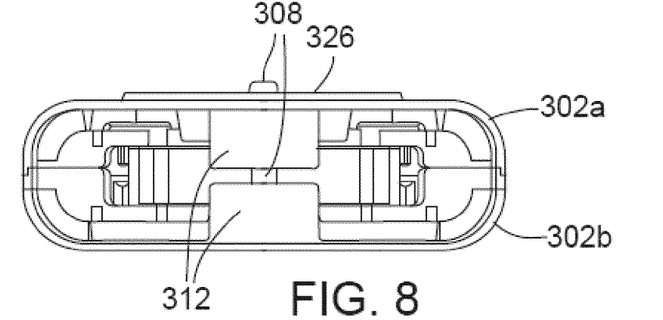
FIG. 8 illustrates an end view of a saw chain sharpening fixture in accordance with various embodiments of the present disclosure.
Figure 9:
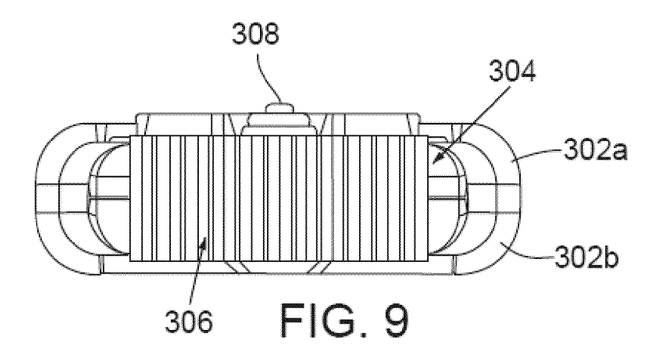
FIG. 9 illustrates a side view of a saw chain sharpening fixture in accordance with various embodiments of the present disclosure.

FIG. 5 illustrates a perspective view, FIG. 6 illustrates a top view and FIG. 7 illustrates a side view, FIG. 8 illustrates an end view and FIG. 9 illustrates on opposing end view of a sharpening fixture 300 is illustrated in accordance with various embodiments. The sharpening fixture 300 is illustrated in a closed position. The upper housing 302a and the bottom housing 302b are coupled to each other and held in place by latch member 308, latch 326, catch 328, and edge 329. As illustrated, the latch member 308 may engage the latch through latch member recess 332. In various embodiments latch member recess 332 may be formed in one side of housing 302a, and 302b. Additionally, when latched, the latching recess 312 may ensure a proper latch by providing a void for debris.

In various embodiments, the actuator 304 includes actuator guide 318. The actuator guide 318 may engage hinge 320 and function to stabilize the actuator 304 and the sharpening element (not illustrated) as the actuator 304 moves into and out of the saw chain sharpening fixture. In various embodiments, the actuator surface 306 may include a number of ridges to provide increased friction as the actuator 304 engages a surface during a sharpening operation. In various embodiments, the actuator surface 306 may have other designs, for example a diamond design. The invention is not to be limited in this regard.

Figure 10A:
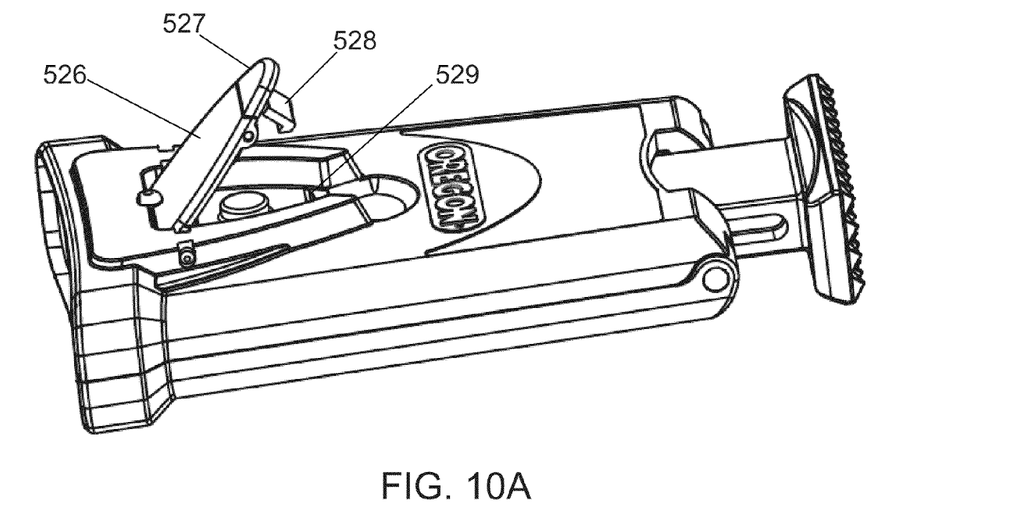
FIGS. 10A-10C illustrate perspective views of a sharpening fixture having a multi piece latch in accordance with various embodiments.
Figure 10B:
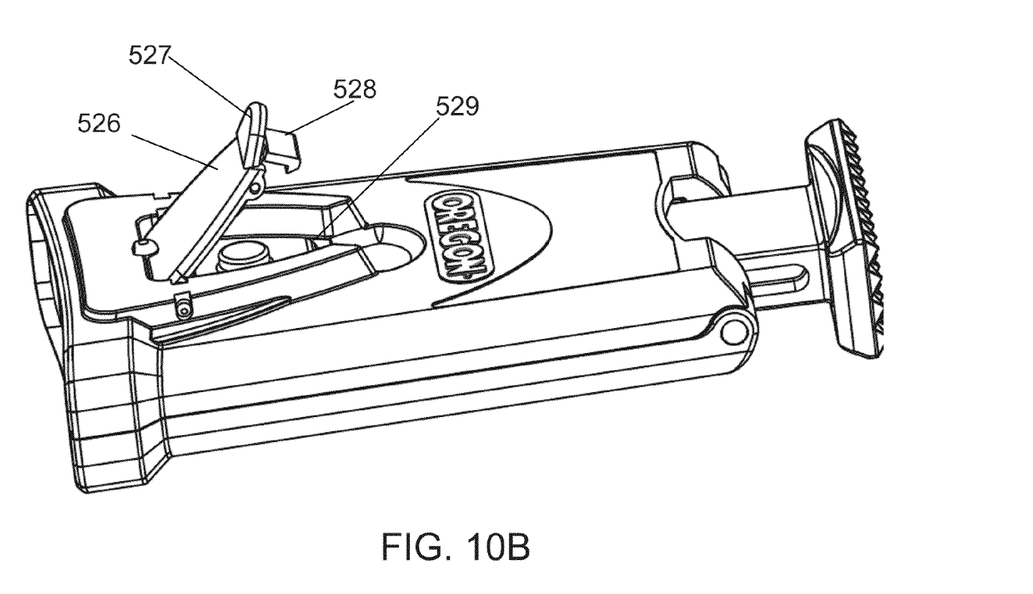
Figure 10C:
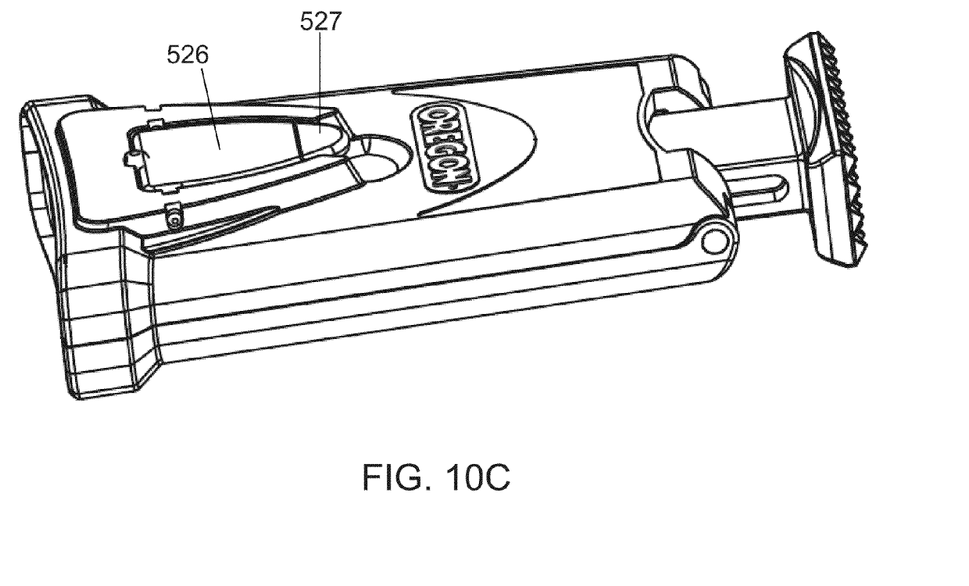

In various embodiments, a two piece latch may be used in order to allow an operator to more easily release the catch holding the latch in place. FIGS. 10A-10C illustrate perspective views of a bar mounted sharpener similar to those described in FIGS. 3-9 above, but show a two piece latch mechanism. In a one piece latch the operator must lift up with enough force to deflect the catch before the catch will release. The two piece latch in accordance with various embodiments only requires the operator to rotate the tip up by overcoming the restoring force of a small spring. The latch can then be raised to release the connection.

In various embodiments, the latch mechanism may include a latch 526, a hinged latch end 527, and a catch 528 coupled to latch end 527. As shown in FIG. 10A, the latch end 527 is in a latching position with the catch 528 configured to engage a catch edge 529. The latch may be rotated towards a horizontal position. As the catch 528 engages the catch edge 529, the latch end 527 may deflect a certain degree (see e.g. FIG. 10B) to allow the catch 528 to pass the catch end 529 and secure the latch in a locked position (as shown in FIG. 10C). So latched, the interface between the catch 528 and the catch edge 529 may help resist a tendency of a saw chain sharpening fixture 500 to open during operation.

To unlatch the latch 526, a finger or tool may grip the latch end 527 and pull outward to move or deflect the latch end to a non-latching position (see FIG. 10B). This will release the catch 528 from the catch edge 529, thus allowing the latch 526 to be raised. By virtue of the hinged connection between the latch end 527 and the latch 526, generally less outward directed force is needed to unlatch the latching mechanism. In various embodiments, the latch end 527 may be biased towards the latching position (as shown in FIGS. 10A and 10C) to help prevent inadvertent delatching or deflection. In various embodiments, the latch 526 may be loaded with a spring or other biasing element, such that when catch 528 is not securely latched with edge 529, the latch 526 is moved into a visibly non-engaged position, e.g. generally perpendicular to the surface of the housing.

Although certain embodiments have been illustrated and described herein, it will be appreciated by those of ordinary skill in the art that a wide variety of alternate and/or equivalent embodiments or implementations calculated to achieve the same purposes may be substituted for the embodiments shown and described without departing from the scope. Those with skill in the art will readily appreciate that embodiments may be implemented in a very wide variety of ways. This application is intended to cover any adaptations or variations of the embodiments discussed herein. Therefore, it is manifestly intended that embodiments be limited only by the claims and the equivalents thereof.

What is claimed is:

1. A method, comprising:
    pressing an actuator of a saw chain sharpening fixture against an environmental object to apply a linear, non-rotary actuation force directed toward a nose portion of a guide bar in a direction parallel to a longitudinal axis of the guide bar,
    wherein the actuator is to, upon receipt of the actuation force, linearly move a sharpening element of the saw chain sharpening fixture towards one or more cutting links of a saw chain as the one or more cutting links traverse the nose portion; and
    sharpening, by the saw chain sharpening fixture, the one or more cutting links of the saw chain.

2. The method of claim 1, further comprising:
    attaching, by an attachment member of the saw chain sharpening fixture, the saw chain sharpening fixture to the nose of the guide bar, wherein the attachment member of the saw chain sharpening fixture includes at least one guide pin and at least one latch pin.

3. The method of claim 2, further comprising:
    guiding, by the at least one latch pin, the sharpening element along a predetermined linear path to facilitate the sharpening.

4. The method of claim 1, further comprising:
    providing a spark arrester of the chain sharpening fixture to help resist emission of sparks from exiting a housing of the chain sharpening fixture.

5. The method of claim 1, further comprising:
    guiding, via one or more guide members of the saw chain sharpening fixture, the sharpening element of the saw chain sharpening fixture along a predetermined path to facilitate the sharpening.

* * * * *